INVENTOR.
JOHN N. HARMAN, III

ATTORNEYS

INVENTOR
JOHN N. HARMAN, III
BY
ATTORNEYS

United States Patent Office 3,509,034
Patented Apr. 28, 1970

3,509,034
PULSE-ACTIVATED POLAROGRAPHIC
HYDROGEN DETECTOR
T. O. Paine, Administrator of the National Aeronautics and Space Administration, with respect to an invention of John N. Harman III, Placentia, Calif.
Filed May 29, 1968, Ser. No. 732,917
Int. Cl. G01n 27/54, 27/46
U.S. Cl. 204—195                    6 Claims

ABSTRACT OF THE DISCLOSURE

A polarographic hydrogen detector having three electrodes, a platinized anode, a copper reference electrode and an auxiliary electrode, and a system for periodic reactivation of the platinized anode by means of potential pulsing. The electrodes are disposed in a housing containing a liquid electrolyte and having a permeable membrane for introduction of hydrogen. Hydrogen is oxidized at the anode, and a current proportional to hydrogen partial pressure is produced. A short-duration cycle of positive and negative potential pulsing is applied periodically to the anode in order to maintain the activity of the platinized anode. A memory and disabling circuit connected to the current output of the detector eliminates the current surges produced during pulsing.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to hydrogen detection instruments and more particularly to a polarographic hydrogen detector.

The use of hydrogen as a rocket engine fuel has created a need for improved methods and instruments for detection of hydrogen in gaseous mixtures. The extreme flammability and explosiveness of hydrogen, combined with its high diffusion rate, necessitate maintenance of stringent tolerances and elimination of leaks in launch vehicles, storage and handling equipment and other components. However, the possibility of some leakage always exists so that a rapid, reliable means of detecting and quantitatively measuring the amount of hydrogen in air or other gas mixtures is required.

Various instruments have been available previously for analysis of hydrogen in gas mixtures, but these instruments generally have one or more characteristics which make them unsuitable for applications incident to the use of liquid hydrogen. In particular, prior instruments have shown a slow response time, insensitivity at high and low hydrogen concentrations, electronic drift and slow recovery time, or hazardous operation in the presence of hydrogen-oxygen mixtures.

One type of hydrogen detector which has shown promise for avoiding some or all of these deficiencies is the polarographic detector. Detectors of this type have a pair of electrodes in contact with a liquid electrolyte and a gas-permeable membrane through which hydrogen from the sample mixture diffuses. A predetermined voltage is impressed across the electrodes so that when hydrogen diffuses into the electrolyte, the hydrogen is oxidized at the anode, generating a current proportional to hydrogen partial pressure in the sample mixture. The anode in such a detector must have a highly active surface, which can be obtained by deposition of a layer of platinum on a metal substrate. However, the activity of the platinized surface degrades in time, resulting in an increase in the time constant of the detector and a decrease in sensitivity and reproducibility of the signal output. It may be readily seen that the operation of polarographic detectors would be greatly improved by providing a means for maintaining the activity of the platinized anode at a constant high level.

SUMMARY OF THE INVENTION

In the present invention a polarographic hydrogen detector is provided with an auxiliary electrode for periodically subjecting the platinized anode to a short-duration cycle of anodic and cathodic potential pulsing so as to maintain the activity of the anode for the hydrogen oxidation reaction by oxidation of the platinum surface to platinum oxide during the anodic pulse and for the reduction of the platinum oxide surface to a highly active, disordered surface of platinum during the cathodic pulse. The highly activated surface state of the platinized anode is maintained at a much more steady level without interfering with operation of the detector, and the initially favorable characteristics of the detector are prolonged. The detector does not sense hydrogen when the detector is being pulsed for anode surface reactivation, and means are provided for elimination from the current readout system, of the current surges produced by such pulsing. Detectors embodying the invention can measure hydrogen concentrations from as low as 0.05 percent to 100 percent, and they show a rapid rate of response, from about 100 to 600 milliseconds depending on the membrane thickness and the particular membrane material.

It is therefore an object of this invention to provide an improved polarographic hydrogen detector.

Another object is to provide a polarographic hydrogen detector having means for maintaining the activity of the platinized elecrode surface therein at a high level.

Another object is to provide an apparatus for reactivating the surface of a platinized electrode in a polarographic hydrogen detector during operation of the same.

Other objects and advantages of the invention will be apparent from the following description and the accompanying drawings.

DESCRIPTION OF THE PREFERRED EMBODIMENT

Figure 1:
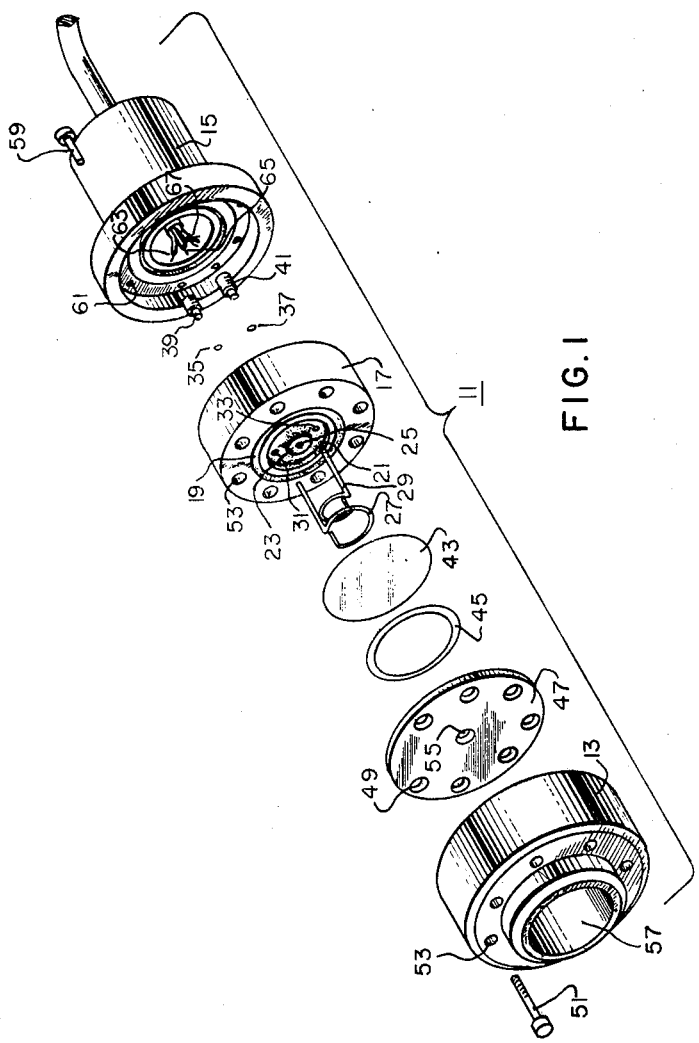
FIGURE 1 is an exploded view of a hydrogen-detector cartridge assembly portion of the present invention and FIGURE 2 is a block diagram partially in schematic form of a hydrogen detecting system incorporating the present invention.

Referring to FIGURE 1 in the drawings there is shown a detector cartridge 11 housing the hydrogen-sensing portion of a detector embodying the invention. The cartridge has a front end cap 13 and a rear end cap 15 surrounding a disc-shaped center body 17. The center body is an epoxy dish having an O-ring groove portion 19 and an electrolyte reservoir 21 formed in the center of the body encircling an anode post 23. The liquid electrolyte (not shown) is preferably an aqueous solution of 0.1 N in sulfuric acid and 0.1 M in copper sulfate. Partially embedded in the anode post so as to only expose the cross-sectional area to the electrolyte, is an anode 25, consisting of a gold wire having deposited thereon a lightly platinized surface layer formed by cathodic electrodeposition of platinum from a solution of a platinum coordination compound, followed by activation by means of repeated cycles of cathodic-anodic potential pulsing. A reference electrode 27 and an auxiliary electrode 29 are each copper wires having circular loops in contact with the electrolyte. The reference and auxiliary electrodes are respectively inserted through holes 31 and 33 in the center body 17 and sealed by O-rings 35 and 37 held in place by packing screws 39 and 41.

A hydrogen-permeable membrane 43, which can be a thin film of plastic material such as polystyrene, is disposed over the face of the cartridge and supported by an O-ring 45 set in the groove 19. A Lucite plastic disc 47 having numerous drilled holes 49 extending through its thickness is placed over the membrane 43. The detector cap 13, fitting over the Lucite discs 47, is held in position by screws 51 mating with threaded inserts 53 in the center body and the drilled holes 49 of the plastic disc. The Lucite disc 47 is also provided with a small diameter hole 55 drilled over the area of the anode post 23 and the detector cap is provided with a center bore 57 to permit access of the test sample to the membrane 43.

The cartridge is covered at the end opposite the detector cap 13 with the rear end cap 15 fitted over the center body 17 and held in position by screws 59 inserted through holes 61 in the detector cap which mate with threaded inserts (not shown) in the center body. Leads 63, 65 and 67 extending through the detector cap 15 are respectively connected to the portions of the anode 25, reference electrode 27 and auxiliary electrode 29 extending through the center body 17 and are linked with the remaining components of the system by appropriate circuitry.

Figure 2:
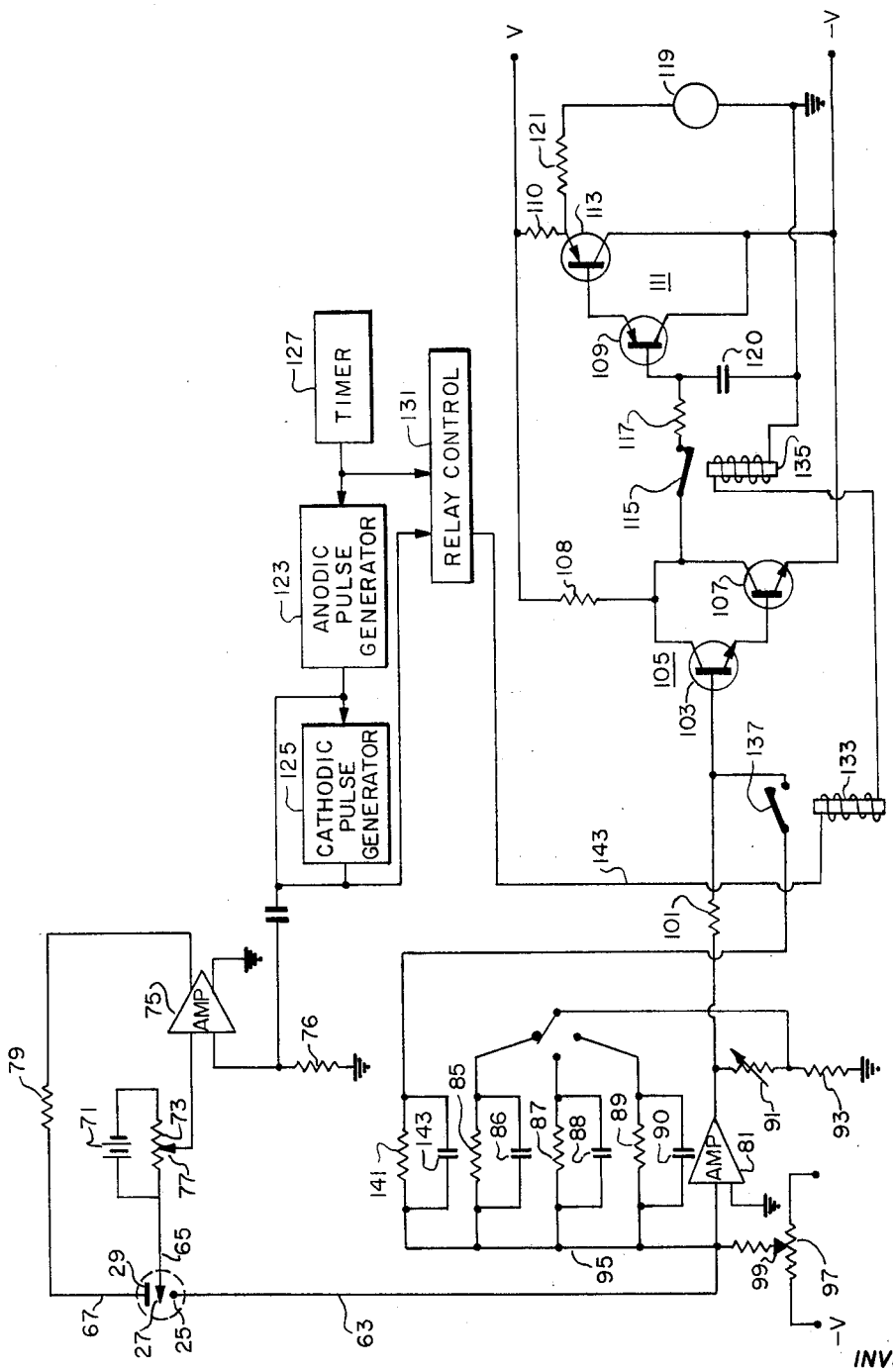

The electrical components of the detector system are shown in FIGURE 2. The detector cartridge is shown as having an anode 25, an auxiliary electrode 29 and a reference electrode 27. The positive terminal of a battery 71, having a trimming resistor 73 connected thereacross, is connected to the input of the reference electrode 27. The resistor 73 is connected to the inverting input of an operational amplifier 75 by tap 77. The non-inverting input of amplifier 75 is connected to ground by resistor 76 and the output of the amplifier is connected to the auxiliary electrode 29 by resistor 79 and lead 67. The anode 25 is referenced to ground through the use of a low input impedance current amplifier 81 having one input thereof connected to the anode by lead 63 and the other input thereof connected to ground.

The reference electrode 27 is employed as a reference potential point for the entire electrode system and the anode 25 is maintained at a predetermined voltage anodic (or more positive) with respect to the reference electrode by adjustment of tap 77. In operation, the anode 25 is maintained at a given potential anodic with respect to the reference electrode by the use of the operational amplifier 75 operating as a potentiostat. The amplifier senses the potential difference between the reference electrode and the anode as an error voltage at its inverting and non-inverting inputs and drives a current through the auxiliary electrode and anode to make this error voltage approach zero. The bias, supplied by the battery 71 and resistor 73 and determined by the setting of tap 77, serves as a series voltage source between the reference electrode and the inverting input to the amplifier.

When this bias is adjusted it appears to the amplifier 75 that the potential of the reference electrode has changed and the amplifier acts to change the absolute potential of the reference electrode by an amount equivalent to that which the series voltage source is changed. A suitable parameter for the setting of the bias or series voltage source is 450 millivolts so as to maintain the anode 450 millivolts positive with respect to the working electrode. Preferably the amplifier 75 has an extremely high input impedance to insure that essentially no current is drawn from the reference electrode. If current were drawn from the reference electrode, the potential of the reference electrode would be changed from its normal value and the potential at which the anode is held would be altered, yielding serious artifacts in the performance of the detector.

As previously indicated the output terminal of the anode 25 is connected to the input of the current amplifier 81, said amplifier having a feedback loop that can be varied by a range selector switch 83. In particular, switch 83 is adapted to connect one end of resistors 85, 87 or 89 having capacitors 86, 88 and 90 connected there across, to the midpoint of variable resistor 91 and resistor 93, which resistors extend between the output of the amplifier and ground. The opposite ends of resistors 85, 87 and 89 are connected to the input of amplifier 81 by lead 95. The resistance value of the three range resistors 85, 87 and 89 differs by a factor of tens for operation of the detector at different ranges of hydrogen concentration. Variable resistor 91 is also placed in the feedback loop to make small adjustments in the gain of amplifier 81.

A zero control circuit is also provided at the input of the amplifiers 81. In particular, the zero control circuit comprises a resistor 97 connected between a source of positive voltage V and a source of negative voltage —V. The input of the amplifier 81 is connected to resistor 91 by tap 99, which is adjusted to compensate for an anodic residual current when the sensor is not exposed to hydrogen gas.

A resistor 101 couples the output of the amplifier 81 to base electrode of transistor 103, which forms the input of a Darlington circuit 105 consisting of transistors 103 and 107. In particular, the collectors of transistors 103 and 107 are connected to a source of positive potential V by resistor 108 while the emitter of transistor 103 is connected to the base of transistor 107 and the emitter of transistor 107 is connected to a source of negative potential —V. The collector of transistor 107 is connected to the base of transistor 109, which forms the input of a second Darlington circuit 111 consisting of transistors 109 and 113, by a normally closed switch 115 and resistor 117. The collectors of transistors 109 and 113 are connected to the source of negative potential —V while the emitter of transistor 109 is connected to the base of transistor 113 and the emitter of transistor 113 is connected to the source of positive potential V by resistor 110. A memory capacitor 120 is connected between the base of transistor 109 and ground. A meter 119 is connected between ground and one end of resistor 121, the opposed end of which is connected to the emitter of transistor 113.

In the operation of a hydrogen detector embodying the invention, hydrogen molecules in the sample gas migrate through the membrane material 43 by a solution, diffusion, dissolution process. The hydrogen molecules dissolve in membrane material, diffuse through the bulk of the membrane, come out of solution at the membrane electrolyte interface, go into solution in the electrolyte layer between the membrane and the anode 25 surface, migrate by a diffusion process through the bulk of the electrolyte layer and finally come out of solution and are absorbed at the anode surface. Upon adsorption of the hydrogen molecules at the platinized gold surface of the anode, the hydrogen molecules are dissociated into hydrogen atoms and are oxidized to form two hydrogen ions and two electrons per hydrogen molecule (or a faraday of charge per molecule of hydrogen). Through these reactions a difference in potential is created between the anode and the auxiliary electrode causing a current to flow to the amplifier 81.

The output of amplifier 81 is applied to the input of the Darlington circuit 105. In the operation of the Darlington circuits 105 and 111 a change in the input current to transistor 103 causes a change in the base current of transistor 107 which in turn causes a change in the collector currents of transistors 103 and 107. This current change causes a voltage change across to common collector resistor 108 proportional to the base input current of transistor 103. The output of the Darlington circuit 105 supplies a charging current to the memory capacitor 117 through the closed switch 115 and resistor 117. The Darlington circuit 111 consisting of transistors 109 and 113 provides a high impedance load for the capacitor 117 and provides a low impedance source for the output circuitry consisting of resistor 127 and meter 119. The memory capacitor 120 serves to maintain the meter reading constant during the pulsing cycle of the anode in a manner to be more fully explained hereinafter.

During the operation of the detector in the foregoing manner, the platinum surface of the anode will degrade by the external oxidation of the surface. These oxides inhibit the hydrogen oxidation reaction and decrease the available surface sites on the anode active toward the hydrogen oxidation reaction. Also if oxides are present on the surface of the anode, a fraction of the hydrogen presented to the anode for oxidation will be consumed in the chemical reduction of the oxide film, and the total amount of hydrogen present will not be sensed by the anode since no electrons are donated to the anode in the chemical oxide reduction process.

To eliminate this problem, the anode 25 is subjected to an anodic-cathodic polarization cycle in which during the anodic pulse, oxidation of the platinum surface to platinum oxide occurs and similarly during the cathodic pulse, reduction of the platinum oxide surface to a highly active, disordered, surface of platinum occurs.

To provide for anodic and cathodic pulsing of the anode 25, the auxiliary electrode 29 is connected to the output of the amplifier 75 for potential pulsing, the pulses being supplied to the non-inverting input of the amplifier 75 by an anodic pulse generator 123 and a cathodic pulse generator 125 whose time base is provided by timer 127. In particular, the anodic and cathodic pulse generators may be two cascaded monostable multivibrators, the first stage of which produces a negative pulse of variable amplitude and width and the second stage of which produces a positive pulse of variable amplitude and width in response to the lagging edge of the anodic pulse. The timer 127 may comprise a free running asymmetrical multivibrator for producing a variable pulse cycle to energize the anodic pulse generator in accordance with the desired anodic and cathodic pulse repetition frequency. The outputs of the anodic and cathodic pulse generators are coupled to the non-inverting input of amplifier 75 by capacitor 78 so as to maintain the DC level constant.

This reactivation process introduces relatively large current surges during the potential pulsing of the anode, and will interfere with the meter reading. In order to eliminate the current surges from appearing on the output meter, the timing pulse which initially activated the anodic pulse generator is applied to a relay control circuit 131 which controls a memory and disabling circuit.

As shown in FIGURE 2, the disabling circuit includes resistor 141 and capacitor 143 connected in parallel, having one end thereof connected to the input of the amplifier 81 by lead 95 and the opposite end thereof connected to the base of transistor 103 by the normally open switch 137. Switch 137 is controlled by solenoid 133 having one end thereof connected to the output of the relay control circuit by lead 143 and the opposite end connected to ground through solenoid 135.

In operation the timing pulse which initially activates the anodic pulse generator 123 also activates the relay control circuit 131 so as to apply an energizing current to solenoids 133 and 135. With solenoid 133 energized switch 137 will close to connect the output terminal of anode 25 to the base of transistor 103 via lead 63, the resistor 141-capacitor 143 circuit and switch 137, so as to provide a shunt circuit around amplifier 81. Also with solenoid 135 energized, switch 115 will open to disconnect the output of Darlington circuit 105 from the input of Darlington circuit 111. The high input impedance of the Darlington circuit 105 minimizes the discharge of the capacitor 120 so as to cause meter 119 to read a constant value during this period.

The output of the cathodic pulse generator 125 is applied to the relay control circuit so as to de-energize the relay control circuit on the lagging edge of the output pulse of the cathodic pulse generator. With the relay control circuit deenergized switch 137 and 115 return to their normal state.

From the foregoing it is seen that periodic potential pulsing of the anode is carried out to maintain the activity of the platinized surface at a constant high level. A pulsing cycle including anodic and cathodic amplitudes and anodic and cathodic pulse widths is employed for this purpose. Suitable pulsing parameters are as follows:

|  | Anodic | Cathodic |
| --- | --- | --- |
| Amplitude | 800 millivolts | 200 millivolts |
| Pulse width | 10 milliseconds | 25 milliseconds |
| Pulse repetition frequency | 1 pulse/20 seconds | 1 pulse/20 seconds |

These values may be varied depending on the construction of the particular detector. In the embodiment shown in FIGURE 2, the anodic and cathodic pulsing of the anode 25 was accomplished by pulsing the auxiliary electrode 29. In this manner the potentiostat amplifier 75 was used so as to obtain a nonfloating pulse generation circuit. Alternately it will be recognized that the anodic and cathodic pulses could be supplied by a pulsing circuit directly connected to the anode 25.

Hydrogen detectors embodying the present invention are effective over a wide range of hydrogen concentrations, from as low as 0.05 to 100 percent. The sample gas mixture containing hydrogen can be air or other oxygen-containing mixture, or it can be primarily an inert gas such as nitrogen or helium. In the embodiment described above a three-position range switch connected to resistors of different values is provided to enable more sensitive output readings in ranges from 0 to 1 percent, and 0 to 10 percent as well as from 0 to 100 percent.

In actual experiments hydrogen detectors having a platinized anode showed a greatly increased response time upon exposure to nitrogen or air where the anode was not periodically pulsed. For example, response time for detection of 1 percent hydrogen in nitrogen is typically doubled after exposure of the anode to nitrogen for 24 hours. However, under the same conditions, except that an anodic-cathodic pulse of the parameters given above was applied to the anode every 20 seconds, response time decreased only slightly.

Although the present invention is described above with respect to a preferred embodiment, it is to be understood that modifications and variations may be employed without departing from the spirit or scope of the invention as will be readily apparent to those skilled in the art. The invention is limited only as indicated by the appended claims.

I claim:
1. An apparatus for analysis of hydrogen in a gaseous mixture comprising:
an electrolyte container having a hydrogen permeable membrane accessible to contact with a gas sample;
an aqueous electrolyte disposed in said container in contact with said membrane;
an anode having a platinized surface in contact with said electrolyte;
a reference electrode disposed in said electrolyte;
an auxiliary electrode disposed in said electrolyte;
polarization means responsive to the potential of said reference electrode and said anode for driving a current from said auxiliary electrode to said anode to maintain said anode a predetermined potential anodic with respect to said reference electrode;
an external circuit connection completing a circuit between said anode and said auxiliary electrode, and electric responsive means in said circuit, whereby a measurable current, which is a function of the hydrogen in the gas sample, can be caused to flow in the electric circuit and can be measured to determine the concentration of hydrogen in the gas sample; and means for periodically pulsing said anode with anodic and cathodic pulses.

2. The apparatus of claim 1 including means for disabling said electric responsive means during said anodic and cathodic pulsing cycle.

3. The apparatus of claim 1 wherein said polarization means comprises:
a source of variable DC voltage having positive and negative output terminals;
means connecting said positive terminal of said variable DC voltage source to said reference electrode;
a potentiostatic amplifier having a non-inverting input terminal, an inverting input terminal and an output terminal;
means connecting said inverting input of said potentiostatic amplifier to said negative terminal of said variable source of DC voltage;
means connecting said non-inverting input of said potentiostatic amplifier to said anode electrode; and
means connecting said output of said potentiostatic amplifier to said auxiliary electrode whereby said potentiostatic amplifier drives a current through the auxiliary electrode and anode until the potential appearing and the inverting input and non-inverting input of said potentiostatic amplifier are equal.

4. The apparatus of claim 3 wherein said pulsing means comprises:
an anodic pulse generator having an output coupled to said non-inverting input of said potentiostatic amplifier and having an input, for producing when energized, a negative pulse of predetermined amplitude and width;
a cathodic pulse generator having an output coupled to said non-inverting input of said potentiostatic amplifier and having an input for producing when energized, a positive pulse of predetermined amplitude and width; and
timing means coupled to the inputs of said anodic and cathodic pulse generator for periodically energizing first said anodic pulse generator and after the completion of said anodic pulse for energizing said cathodic pulse generator.

5. The apparatus of claim 4 wherein said electric responsive means includes a current amplifier having an input connected to said anode and having an output;
current indicating means coupled to said output of said current amplifier;
a shunt circuit connected across said current amplifier, said shunt circuit including a normally open switch; and
switch control means responsive to said anodic and cathodic pulses for closing said switch on the initiation of said anodic pulse and for opening said switch on the lagging edge of said cathodic pulse.

6. The apparatus of claim 5 including memory means coupled to said current indicating means for maintaining the current supplied to said current indicating means constant during said anodic and cathodic pulsing cycle.

References Cited

UNITED STATES PATENTS

| | | | |
|---|---|---|---|
| 2,805,191 | 9/1957 | Hersch | 204—1.1 |
| 3,179,581 | 4/1965 | Lewin et al. | 204—195 |
| 3,260,656 | 7/1966 | Ross | 204—195 |
| 3,325,378 | 6/1967 | Greene et al. | 204—195 |
| 3,328,277 | 6/1967 | Solomons et al. | 204—195 |
| 3,448,031 | 6/1969 | Robinson | 204—195 |

TA-HSUNG TUNG, Primary Examiner